United States Patent [19]

Arnim et al.

[11] 4,012,208

[45] Mar. 15, 1977

[54] ANTI-POLLUTION UNIT FOR ATTACHMENT ON SMOKE STACKS, AND THE METHOD OF REDUCING SMOKE STACK POLLUTION

[76] Inventors: Lawrence E. Arnim; Lawrence E. Arnim, Jr., both of 516 W. Main St., Houston, Tex. 77006

[22] Filed: Aug. 20, 1975

[21] Appl. No.: 606,178

[52] U.S. Cl. ............................... 55/223; 55/356; 261/DIG. 9

[51] Int. Cl.² ...................................... B01D 47/06

[58] Field of Search ................ 55/84, 85, 89, 159, 55/220, 223, 229, 257, 356, 357, 228; 261/DIG. 9

[56] References Cited

UNITED STATES PATENTS

| | | | |
|---|---|---|---|
| 1,339,495 | 5/1920 | Caskey | 55/356 |
| 2,646,263 | 7/1953 | Goldberg | 55/220 X |
| 3,773,308 | 11/1973 | Allen | 55/228 X |
| 3,785,126 | 1/1974 | Smitherman | 55/228 |
| 3,841,063 | 10/1974 | Abshed et al. | 55/228 |
| 3,904,376 | 9/1975 | Kawata | 55/220 X |

*Primary Examiner*—John Adee
*Attorney, Agent, or Firm*—Ranseler O. Wyatt

[57] ABSTRACT

This invention relates to an anti-pollution means for attachment to a smoke stack, and consists of forming a conduit over the top of the stack to entrain the discharge therefrom when the stack is in operation, by forced draft, drawing the emission through a conduit adjacent the stack and into a water bath to thoroughly extinguish any burning carbons and to filter any ash or other residue before discharge of the emission, and discharging the washed emission downwardly and outwardly at ground level.

It is also an object of this invention to teach a method of anti-pollution by forming an air stream above a smoke stack and drawing the smoke stack emission into the air stream and away from the top of the stack when is in operation and subjecting the emission to a water spray before venting the remaining gas at ground level.

6 Claims, 3 Drawing Figures

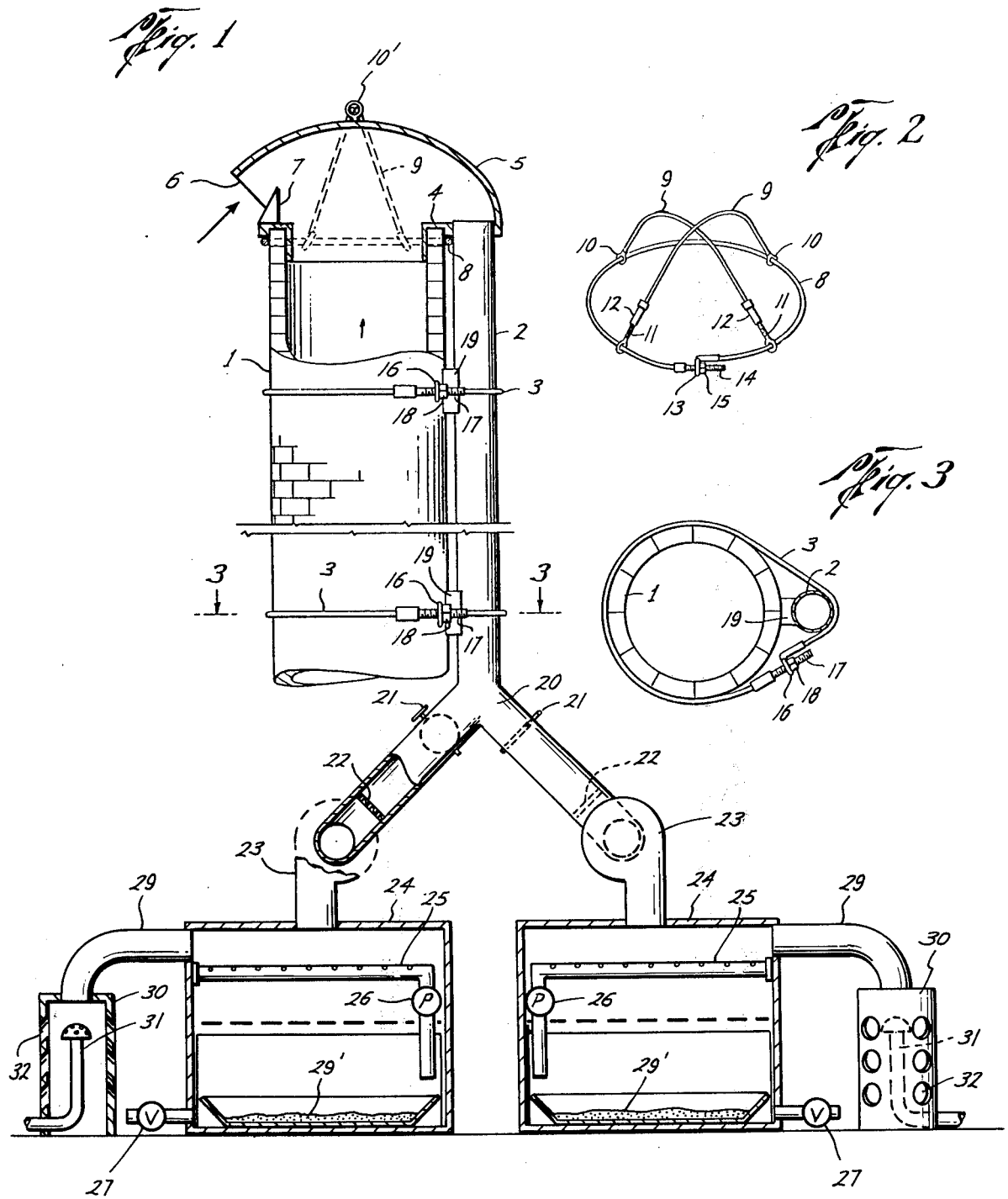

ANTI-POLLUTION UNIT FOR ATTACHMENT ON SMOKE STACKS, AND THE METHOD OF REDUCING SMOKE STACK POLLUTION

BACKGROUND OF THE INVENTION

Many devices have been employed in attempts to remove odors, ash and carbon residue from smoke stacks, some of which have been effective but are too expensive for the average installation, or require prohibitive operation and maintenance costs. Adequate means are available for use in construction of new stacks, but the need exists for a means of controlling pollution caused by emission from old stacks, built prior to present awareness of environmental pollution.

SUMMARY OF THE INVENTION

An attachment for smoke stacks adapted to draw the emission therefrom into a water bath prior to release of the emission into the atmosphere at ground level, and the novel method of directing the flow of emission from an operating smoke stack through a water bath and discharging same at ground level.

BRIEF DESCRIPTION OF THE DRAWING

FIG. 1 is an elevational view, partially in cross section, showing the device installed on a smoke stack.

FIG. 2 is an enlarged view of the anchoring means employed, and

FIG. 3 is a cross sectional end view taken on the line 3—3 of FIG. 1.

DESCRIPTION OF THE PREFERRED EMBODIMENT

In the drawings, the numeral 1 designates a smoke stack on which a conduit 2 is mounted as by the encircling straps or cables 3, 3. The crown 5 having its lower end reduced diametrically as at 4, the reduced end being shaped to conform to the inside diameter of the top of the stack and to fit inside the stack, and which has the dome shaped top which is enlarged to extend over the stack opening. One end of the conduit 2 is open and extends into the crown 5, providing a stack discharge opening, and an opening 6 in the crown provides means for drawing air from the atmosphere into the crown. A baffle 7 is formed in the crown across the opening 6, said baffle having an inwardly sloping face, directing a flow of air across the top of the crown and across the top of the stack, the air flow being above the top of the stack so that it will not interfere with the natural flow of emission therefrom, and will have no effect on the fire below, but will entrain the emission as it leaves the stack.

An anchoring cable, as 8, having the cross cables 9, 9 maintain the crown 5 in position on the stack, the cables 9, 9 being secured to the cable 8 at one end by the eyes, as 10, and the other end being anchored to the cable 8 by the externally threaded shank 11, and internally threaded tubular connection 12, and being maintained centered on the crown 5 by passing through the crown eye 10' which is integral with the crown 5. The cable 8 is secured to the stack by means of the eye 13 on one end of the cable and the externally threaded member 14 on the other end, maintained in position by means of a nut 15.

The conduit 2 extends downwardly parallel with the stack 1, and is anchored in place by means of the cables 3, which are similar to the cable 8, being provided with an eye 16 at one end and an engaging, externally threaded shaft 17 on the other end, the threaded shaft 17 passing through said eye 16, and a nut 18 on the threaded end of the shaft 17 to adjust the cable. Suitable spacing means, such as the insulated blocks 19, 19, space the conduit 2 from the surface of the stack 1.

The conduit 2 terminates at its lower end in a Y-shaped connection 20, each leg of the Y having a manually controlled damper 21, 21, a grid 22, 22 and a fan housing 23, 23, in which suitable fans may be mounted. Switches (not shown) manually control the respective fans.

Each housing 23, 23 terminates in one of the chambers 24, 24 which may be buildings of any desireable size, and which contain a water spray means 25 adapted to provide a fine spray of water through which the emission from the respective fan housings 23, 23 passes. A pump, as 26, circulates the water in each chamber 24, and maintains the spray in operation. A three-way valve as 27 is mounted in the drain conduit 28 in each chamber 24. The chambers 24, 24 may be periodically drained and the debris, as 29, removed.

A conduit, as 29, leads from each chamber 24, to a deflector box 30, where the washed fumes from the chamber 24 are again washed by the spray 31, and then permitted to escape through the downwardly directed orifices 32, 32, which will direct the escaping fumes into the ground.

The device is designed to be readily applied to existing smoke stacks, the crown resting on the top of the stack, and being anchored in place by the cable 8 and the cross cables 9, 9. When the stack is in operation, one of the legs of the Y 20 may be selected as the discharge conduit, or both chambers 24 may be simultaneously used, or one used and the other remain in reserve. In the event of the use of one of the chambers 24 only, the damper of the selected leg will be moved to open position, and the damper of the opposite leg will be moved to closed position. The fan in the selected leg will be turned on and air will be drawn from the atmosphere through the crown 5, above the top of the stack, entraining the stack emission, carrying same into the conduit 2, and any pieces of fly ash in the emission will pass through and be broken up by the grid 22, and the gas and carbon and such other debris as might be in the smoke stack emission will be passed through a water spray and will, by gravity, drop into the water in the container, where the heavier matter will sink to the floor of the chamber 24. An air discharge line 29 leads from the upper portion of each chamber 24 and into a vent box 30 and through another water spray from the spray 31, and through the downwardly directed ports 32, 32 which will direct the gas flow downwardly through the ports onto the ground where it will dissipate into the atmosphere.

The method herein taught is the capture of the emission from a smoke stack while it is in operation and directing same by forced draft through a water bath, where any burning ash will be extinguished and any debris will be filtered out before the air stream is released to the atmosphere, by means of a unit mountable on existing stacks. In the event of failure of the unit, such as where the fans cease to operate, or the like, the stack will continue to function as originally intended, the opening 6 in the crown being open to the atmosphere.

What we claim is:

1. In an anti-pollution device for attachment to smoke stacks, a crown formed to be detachably mounted on the top of a smoke stack and to extend over and above the top of the stack, a supporting harness on said crown having an adjustable horizontal cable around said crown at its juncture with the stack, and adjustable cross cables extending from said horizontal cable to a ring mounted in the outside top wall of the crown at its vertical axis, said crown having an opening into the ambient atmosphere, said opening forming a lateral air inlet in said crown and a conduit leading from and in flow connection with said crown and mounted in parallel relation with said stack, a baffle in said crown directing a flow of air across the top of the stack and into said conduit, said conduit terminating in a dual connection, each leg of said dual connection having a fan mounted therein adapted to selectively form an air stream through said crown and conduit when said stack is in operation, entraining the emission from the stack, and each leg terminating in an independent housing, means for maintaining a water spray in each of said housings through which said stack emission is selectively passed, and means for discharging the washed gas from said chamber.

2. The device defined in claim 1 wherein a center ring is formed in said harness for raising and lowering the crown, and a grid is mounted in each leg of said dual connection through which stack emission is forced to pass when the emission is directed through said leg, said grid being of a fine mesh.

3. The device defined in claim 1 wherein each of said housings is provided with means for selectively supplying water to said housing and with drain means to remove water from said housing when said stack is out of operation.

4. The device defined in claim 1 wherein said means for discharging washed air from said housings consists of a container, a tubular connection between said container and housing forming a passageway therebetween and said container having downwardly directed passageways through its side walls through which washed air passes into the atmosphere at the ground surface.

5. The device defined in claim 1 wherein said opening in said crown into the ambient atmosphere is of sufficient diameter to provide normal operation of said stack in the event of failure of the fans.

6. The device defined in claim 1 wherein said means for venting the washed air from said chambers consists of a container having side walls, a water spray in said container and downwardly directed ports in the side walls of said container for directing the washed air into the ambient atmosphere at the ground surface.

* * * * *